US007905532B2

(12) United States Patent
Johnson

(10) Patent No.: US 7,905,532 B2
(45) Date of Patent: Mar. 15, 2011

(54) TAILGATE WORKBENCH

(76) Inventor: Scott Andrew Johnson, Logansport, IN (US)

(*) Notice: Subject to any disclaimer, the term of this patent is extended or adjusted under 35 U.S.C. 154(b) by 120 days.

(21) Appl. No.: 12/025,218

(22) Filed: Feb. 4, 2008

(65) Prior Publication Data

US 2008/0185861 A1 Aug. 7, 2008

Related U.S. Application Data

(60) Provisional application No. 60/899,502, filed on Feb. 5, 2007.

(51) Int. Cl.
*B60R 13/01* (2006.01)

(52) U.S. Cl. .................... 296/39.1; 296/26.11

(58) Field of Classification Search ............... 296/39.1, 296/61, 50, 26.11, 37.6, 57.1, 51, 56
See application file for complete search history.

(56) References Cited

U.S. PATENT DOCUMENTS

| | | | | |
|---|---|---|---|---|
| 3,726,422 A * | 4/1973 | Zelin | ............................ | 296/37.1 |
| 4,531,773 A * | 7/1985 | Smith | ........................ | 296/26.11 |
| 4,705,254 A * | 11/1987 | Swanson | .................. | 248/288.11 |
| 4,887,526 A * | 12/1989 | Blatt | .............................. | 108/44 |
| 5,090,335 A * | 2/1992 | Russell | ............................ | 108/44 |
| 5,169,202 A * | 12/1992 | Cupp et al. | ....................... | 296/51 |
| 5,215,346 A * | 6/1993 | Reitzloff et al. | ................. | 296/51 |
| 5,518,158 A * | 5/1996 | Matlack | ........................ | 296/37.1 |
| 5,649,731 A * | 7/1997 | Tognetti | ..................... | 296/26.09 |
| 5,649,734 A * | 7/1997 | Speis | ............................. | 296/57.1 |
| 5,730,344 A * | 3/1998 | Mauch | .......................... | 224/402 |
| 6,045,172 A * | 4/2000 | Thomas et al. | ............... | 296/26.1 |
| 6,193,294 B1 | 2/2001 | Disner et al. | | |
| 6,206,445 B1 * | 3/2001 | Brooks | ........................ | 296/39.2 |
| 6,364,391 B1 * | 4/2002 | Everett | ............................ | 296/51 |
| 6,641,190 B2 * | 11/2003 | Kirchhoff | .................. | 296/26.11 |
| 6,779,824 B1 * | 8/2004 | Lazarevich et al. | ............. | 296/50 |
| 6,811,067 B2 * | 11/2004 | Muizelaar et al. | ........... | 296/37.6 |
| 6,843,519 B2 * | 1/2005 | Ojanen | .......................... | 296/50 |
| 6,941,655 B1 * | 9/2005 | Bisland | .......................... | 296/50 |
| 6,991,277 B1 * | 1/2006 | Esler | .............................. | 296/50 |
| 7,052,066 B2 * | 5/2006 | Emery et al. | .................. | 296/37.1 |
| 7,354,090 B1 * | 4/2008 | Pomorski | ................... | 296/26.11 |
| 7,628,439 B1 * | 12/2009 | Strong | ......................... | 296/26.03 |
| 2005/0062309 A1 * | 3/2005 | Juzwiak et al. | ................. | 296/51 |
| 2008/0185861 A1 * | 8/2008 | Johnson | ..................... | 296/26.11 |

* cited by examiner

*Primary Examiner* — Kiran B. Patel
(74) *Attorney, Agent, or Firm* — Bose McKinney & Evans LLP

(57) ABSTRACT

The present invention provides a workbench assembly for mounting to a tailgate of a vehicle, such that when the tailgate is lowered from a substantially closed position to a substantially open position, the workbench assembly remains coupled to the tailgate and requires no additional changes to make the workbench assembly ready for use. The workbench assembly includes a base which has a first receptacle for receiving a working piece and a second receptacle for receiving a sealed compartment for a power inverter. The base can also be used for storage and further includes lighting and means for securing clamps and other objects to the workbench assembly.

13 Claims, 4 Drawing Sheets

TAILGATE WORKBENCH

RELATED APPLICATIONS

This application claims priority to U.S. Provisional Application Ser. No. 60/899,502, filed Feb. 5, 2007, which is hereby incorporated by reference in its entirety.

BACKGROUND

The present invention relates to a workbench assembly, and in particular to a workbench assembly mounted to a tailgate.

The tailgate of a pickup truck has been found to be useful as a workstation. Such workstations can be created by opening the tailgate into a flat position and using the tailgate and truck bed as a support surface for performing various tasks. In some instances, toolboxes or storage compartments can be mounted to the tailgate such that these devices are accessible by simply lowering the tailgate. However, most common arrangements of such workstations being incorporated with the tailgate require the tailgate to be lowered and the workstation disassembled, removed, or the configuration to be changed before it can be used. This often requires additional effort and time to reconfigure the tailgate into a workstation before work can be completed, and this presents an inconvenience to the user. Additionally, most workstations do not facilitate the use of power tools, which can be disadvantageous depending on the type of project to be completed.

SUMMARY OF THE INVENTION

The present invention addresses the disadvantages of the prior art and provides a workbench assembly that is mounted to a tailgate such that when the tailgate is moved from a substantially closed position to a substantially open position, the workbench assembly remains mounted to the tailgate and does not change its position prior to being used.

In an exemplary embodiment, the workbench assembly includes a base having a first receptacle in which a working piece can be inserted into. The working piece is coupled or fastened to the base to prevent it from easily being removed, but it is not permanently secured to the base. This allows a plurality of working pieces to be mounted to the base for various projects. In general, the working piece includes a work surface which is used for completing work on. The working piece may have a work surface on both the top and bottom of the working piece.

The workbench assembly, and in particular the base, is mounted to a tailgate of a vehicle such that when the tailgate is moved from a substantially closed position to a substantially open position, the base remains coupled to the tailgate. In the substantially open position, the workbench assembly is available as a workbench without having to change configuration or position relative to the tailgate. In another embodiment, the base may further include a second receptacle for storing materials or for use as a power inverter compartment.

In a different embodiment, a method is provided for using a workbench assembly mounted to a tailgate of a vehicle, wherein the tailgate can be lowered and raised from a substantially closed position to a substantially open position. As the tailgate is lowered to the substantially open position, the workbench assembly is provided in a substantially horizontal position without having to alter or reconfigure the workbench assembly. A cable or similar device may be connected from the vehicle's battery or another power supply and coupled to a power inverter stored in one of a plurality of receptacles in the workbench assembly.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Broadly, the present invention provides a workbench assembly that is mounted to a tailgate of a vehicle. As the tailgate opens and closes, the workbench assembly remains mounted to the tailgate. In contrast to the prior art, as the tailgate is lowered into a substantially horizontal and open position, the workbench assembly of the present invention is immediately available for use without having to be disassembled, reconfigured, adapted, or otherwise changed relative to the tailgate.

Figure 1:
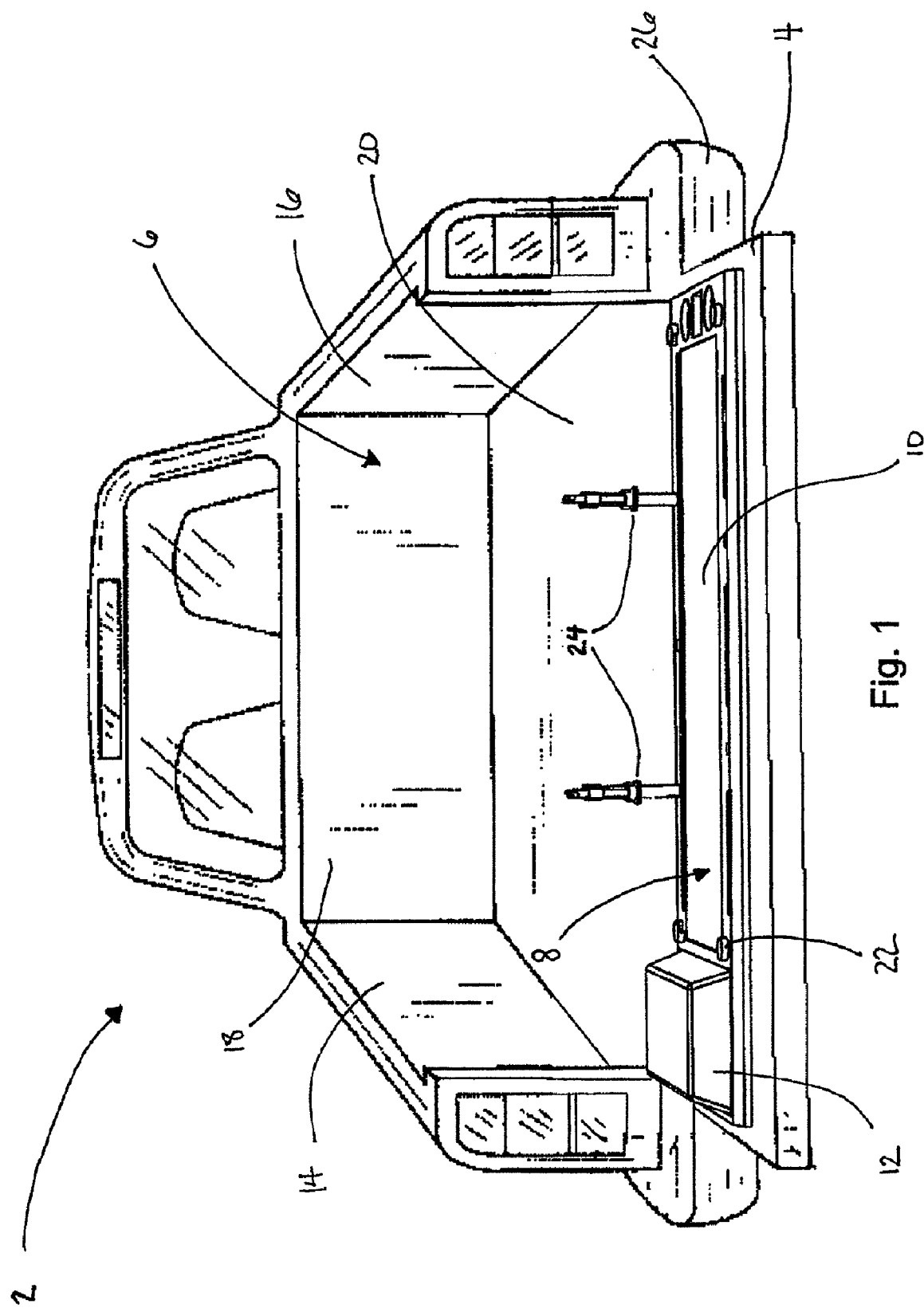
FIG. 1 is a perspective view of the back of a vehicle with a tailgate in the substantially open position and a workbench assembly mounted thereon.
Figure 2:
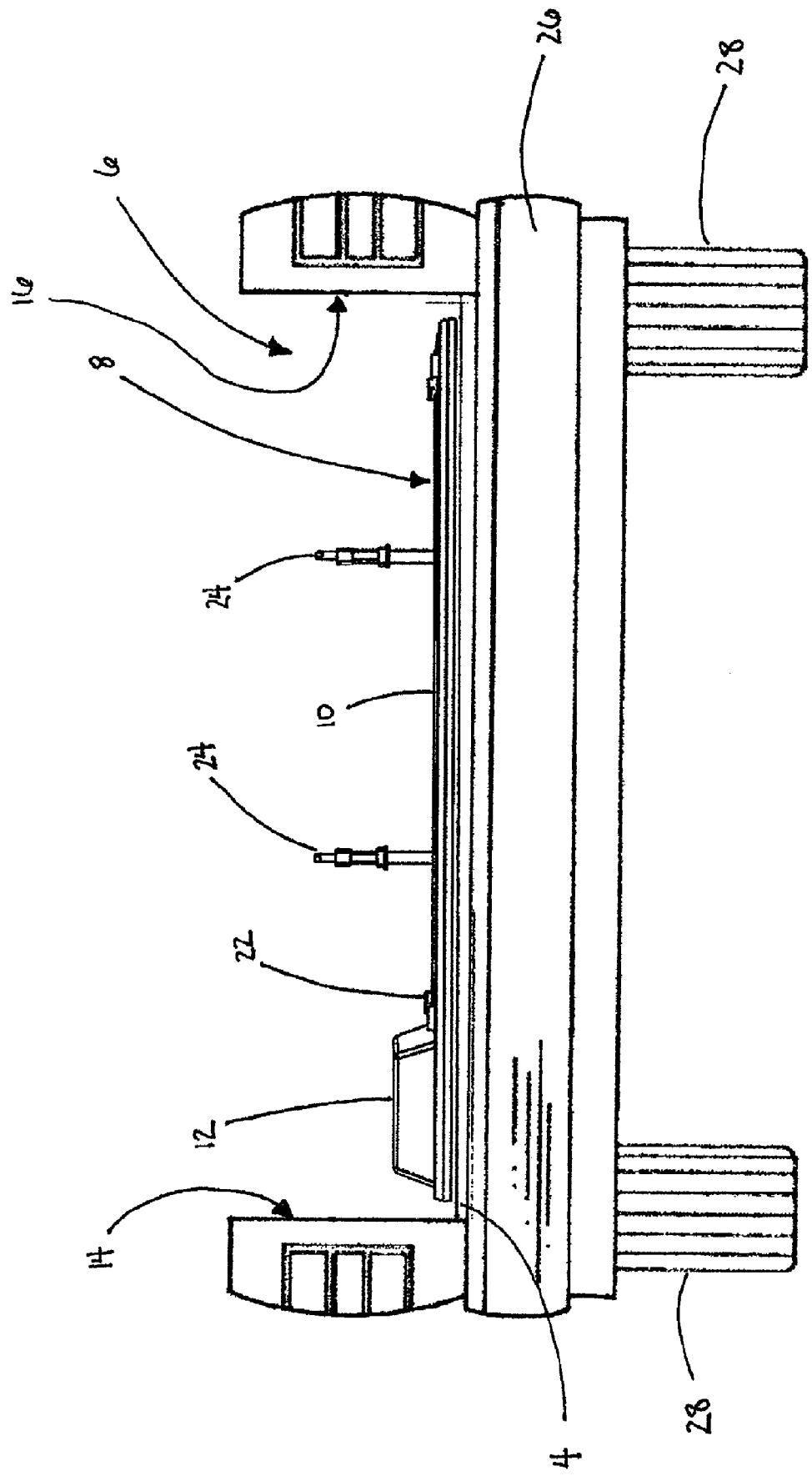
FIG. 2 is a front view of the workbench assembly of FIG. 1 mounted to the tailgate.

In an exemplary embodiment of the present invention, a vehicle 2 is shown as a pickup truck from the rear in FIGS. 1 and 2. The vehicle 2 includes a truck bed 6 that is surrounded by a first side 14, second side 16, third side 18, bed floor 20, and a tailgate 4. The tailgate 4 is configured to pivot about hinges (not shown) between an open position (as in FIG. 1) and a closed position (not shown). The truck bed 6 is open to its surroundings from above, although in alternate embodiments, the truck bed may not be open to its surroundings from above, such as when a camper shell is mounted to the truck bed 6. The vehicle of FIG. 1 includes a rear bumper 26 and a plurality of wheels or tires 28 (see FIG. 2).

In the embodiment of FIGS. 1 and 2, a workbench assembly 8 is mounted to the tailgate 4. The means for attaching the workbench assembly 8 can vary depending on the application for using the workbench assembly 8. In one embodiment, the workbench assembly can be screwed into the tailgate 4 with screws, bolts or other fasteners (not shown). In other embodiments, the workbench assembly 8 can be secured with adhesive, rope, cords, wire, clamps, or any other fastening means.

In an advantageous embodiment, the workbench assembly 8 is coupled to the tailgate 4 such that, as the tailgate 4 is pivoted or moved from a substantially closed position to a substantially open position, and vice versa, the workbench assembly 8 remains securely coupled to the tailgate and also pivots with the tailgate 4. Accordingly, the length 9 and width 11 of the workbench assembly 8 is at least slightly less than the corresponding length and width of the tailgate 4 in order to prevent one or more edges of the workbench assembly 8 closest to the truck bed 6 from interfering with the opening and closing of the tailgate 4. However, it is advantageous to have the cross-sectional area of the workbench assembly 8 to be as great as possible to facilitate a large working piece 10 on the workbench assembly 8 for a user to complete any desired task.

In another advantageous embodiment, as the workbench assembly 8 is pivoted from a substantially closed position to a substantially open position, the working piece 10 is immediately accessible and ready to be used. In other words, the workbench assembly 8 remains securely coupled to the tailgate 4 as it is pivoted between positions, and the workbench assembly 8 does not have to be reconfigured, adapted, changed, or oriented relative to the tailgate 4 once it reaches the substantially open position. Therefore, the workbench assembly 8 is immediately available for use upon lowering the tailgate 4 to the substantially open position without the user having to disassemble and/or assemble, unlatch, unfold, unlock, or provide further support to the workbench assembly 8 before it can be used. Accordingly, this embodiment provides convenience and saves time for the user.

Figure 3:
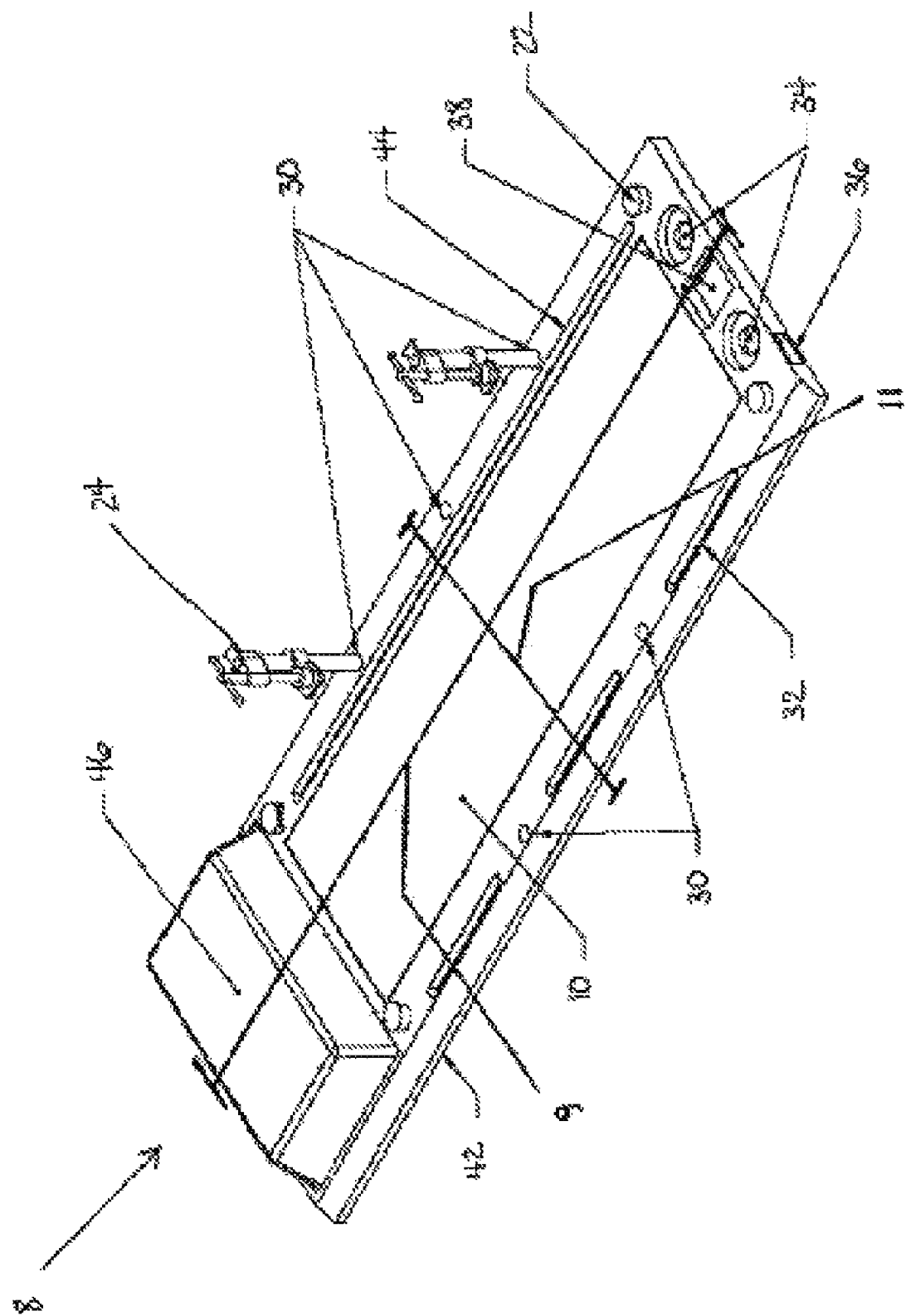
FIG. 3 is a perspective view of a workbench assembly with a sealed compartment for a power inverter.

In the embodiment of FIG. 3, the workbench assembly 8 includes the working piece 10 and a base 42. Although not shown in FIG. 3, the base 42 includes a first receptacle in which the working piece 10 is removably disposed therein. The working piece may be coupled to the base 42 or it may loosely slide into the first receptacle of the base. In one embodiment, the base 42 may be mounted to the tailgate 4 and the working piece 10 may reversibly couple to the base. In this embodiment, either the top or bottom surface of the working piece 10 may be used as a working surface. If, after using one surface of the working piece 10 for a period of time the user wants to flip the working piece 10, the opposite surface may be used as the working surface. In an alternate embodiment, the working piece 10 may have hooks, snap-fit connectors, nails, screws, or other similar fasteners for holding tools and/or for other purposes. In this embodiment, the base 42 may be mounted to the tailgate 4 and the working piece can only be coupled one way (e.g., the surface with the fasteners facing a direction opposite the tailgate 4). In another embodiment, the base 42 and working piece 10 may already be coupled before being mounted to the tailgate 4. In this particular embodiment, the workbench assembly 8 is mounted as a whole to the tailgate 4. In a completely different embodiment, the working piece 10 itself may be mounted directly to the tailgate 4 without the base 42.

The working piece 10 can be made from any number of materials including wood, plastic, steel, or any other material desired by the skilled artisan. In an embodiment where the working piece 10 is made of wood, the wood should be flat and durable. In another embodiment, the working piece 10 can be rigidly fastened to the base 42 or tailgate 4 (see above) such that the working piece 10 can be replaced easily if necessary. The working piece 10 allows users to mount other items to the workbench assembly 8 without damaging the tailgate 4.

The base may also include a second receptacle 40 (see FIG. 4) which can be used to store loose items such as hammers, screw drivers, wrenches, power tools, and the like. As shown in the embodiment of FIG. 3, the second receptacle 40 may also be incorporated to include a sealed compartment 46 for housing a power inverter. The compartment 46 comprises a sealed area for holding the power inverter (not shown) and preventing water, dirt, dust, sand, and other particles from damaging the power inverter. In order to provide power to the power inverter, one end of a cable or wire (not shown) can be coupled to the power inverter and the second end of the cable or wire can be coupled to the vehicle's battery (not shown) or another DC power source. By energizing the power inverter, power tools needing AC power including saws, drills, grinders, etc. can be electrically coupled to the power inverter and used in locations where local power outlets are unavailable. In a different embodiment in which a power inverter is unnecessary, the sealed compartment 46 may still be used for storage and/or other purposes. Additionally, a second working piece (not shown) may be removably disposed in the second receptacle in other embodiments to increase the overall working surface.

Figure 4:
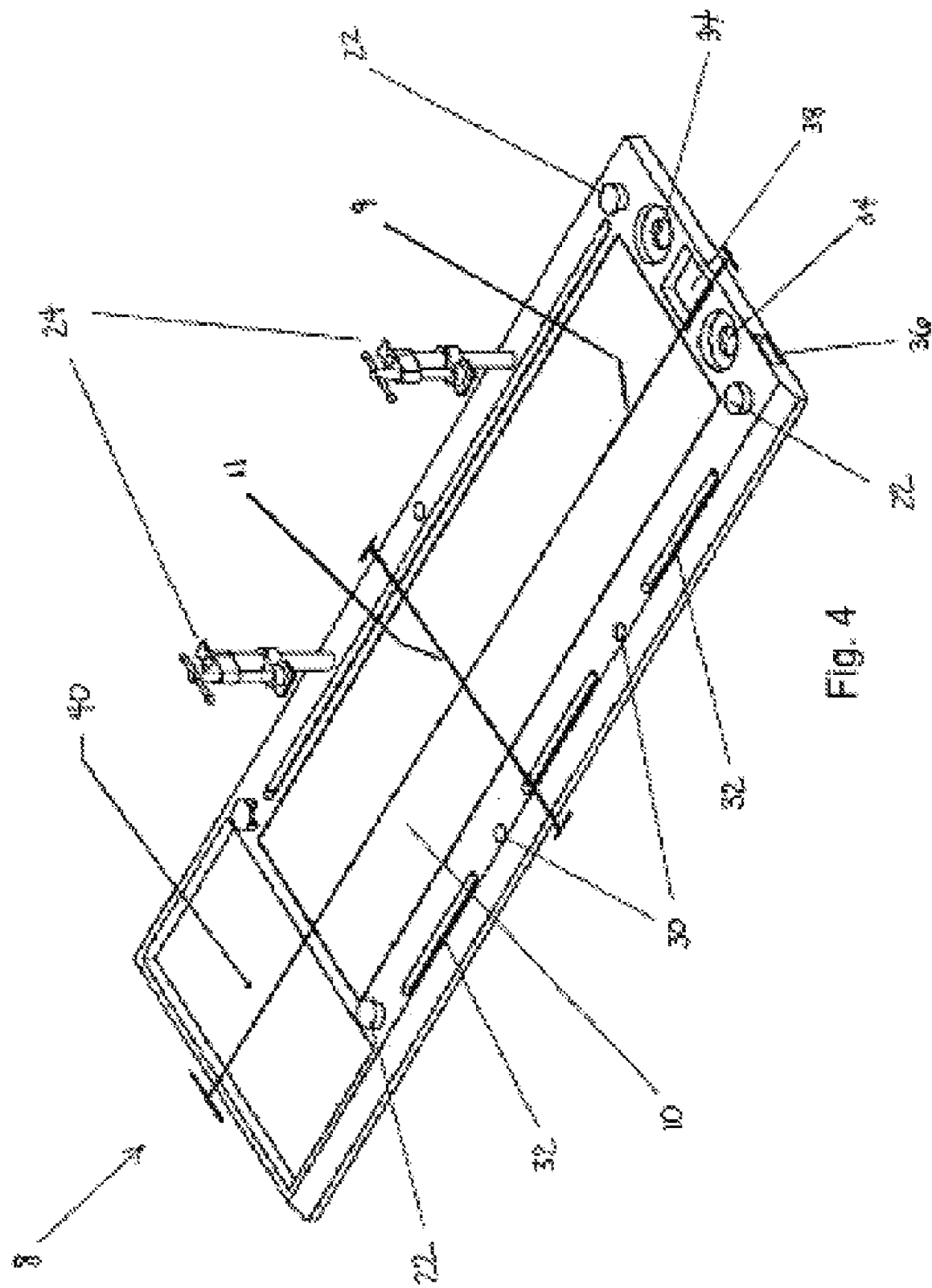
FIG. 4 is a perspective view of a workbench assembly with a storage pocket.

As shown in the embodiments of FIGS. 3 and 4, the base 42 may also include a plurality of openings 30 for holding clamps 24 along the length of the base 42. Also, a light source 22, such as a light-emitting diode ("LED"), may be positioned at various locations including the corners of the base 42. At one end of the base 42 opposite the sealed compartment 46 there may be receptacles 34 for holding drinks and a magnetic tray 38 for holding screws, nails, etc. A battery holder 36 may also be provided in the base 42 for housing batteries which can be used to provide power to the light source 22. As shown in FIG. 3, a storage groove 44 that extends along the length of the working piece 10 may be incorporated on at least one side of the base 42 and smaller grooves 32 for holding pens, pencils, drill bits, etc. may be incorporated on the other side.

In other embodiments, which are not shown, the workbench assembly may be used for storing items including hunting gear, boating and fishing gear and/or supplies, tailgating goods, camping gear, picnic items, and for many other purposes known to one of skill in the art. In these embodiments, the working piece 10 may include hooks, snap-fit connectors, or other similar fasteners for holding gear and/or supplies, fishing rods, firearms, etc. Additionally, rather than storing the power inverter in the sealed compartment, as described above, the sealed compartment 46 may be used to store other items including fishing lures, bait, ammunition, small firearms, picnic items, or any other item desired by the skilled artisan. The working piece 10 may then be used to clean fish/game. Also, during a picnic or while tailgating prior to a sporting event, the working piece 10 may be used similar to a table for setting up food and/or drinks. One may use the working piece as a table to eat from. It may also be possible to remove the working piece 10 and use the first receptacle to store items including picnic items, fishing/hunting gear, camping gear, and other items desired by the skilled artisan, but still being able to use the top surface of the working piece 10 for cleaning fish/game and/or for other purposes desired by a skilled artisan.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A tailgate workbench assembly, comprising:
a base for mounting to a tailgate of a vehicle wherein the tailgate pivots between a substantially closed position and a substantially open position, the base remaining coupled to the tailgate during movement between the substantially closed position and substantially open position;

a working piece, wherein the working piece is disposed in the base; and wherein, as the tailgate is pivoted to the substantially open position, the tailgate workbench assembly is immediately available for use without having to be disassembled, reconfigured, adapted, or otherwise changed relative to the tailgate.

2. The tailgate workbench assembly of claim 1, wherein the base has a first receptacle and a second receptacle, the working piece being in the first receptacle.

3. The tailgate workbench assembly of claim 1, wherein the length and width of the workbench assembly is at least slightly less than the corresponding length and width of the tailgate in order to prevent one or more edges of the workbench assembly closest to the truck bed from interfering with the opening and closing of the tailgate.

4. The tailgate workbench assembly of claim 1, wherein the working piece is made of wood.

5. The tailgate workbench assembly of claim 1, further comprising a sealed compartment, the sealed compartment being removably disposed in the second receptacle.

6. The tailgate workbench assembly of claim 1, further comprising a plurality of clamps removably coupled to the base.

7. The tailgate workbench assembly of claim 1, further comprising a plurality of light sources coupled to the base.

8. The tailgate workbench assembly of claim 7, wherein the plurality of light sources comprises light-emitting diodes.

9. The tailgate workbench assembly of claim 1, wherein the base comprises grooves for holding tools, fasteners, or utensils.

10. The tailgate workbench assembly of claim 1, wherein the base comprises a compartment for holding a battery.

11. The tailgate workbench assembly of claim 1, wherein the base comprises a magnetic receptacle for holding metallic objects.

12. The tailgate workbench assembly of claim 1, wherein the base comprises a plurality of drink holders.

13. The tailgate workbench assembly of claim 1, further comprising a second working piece being coupled in the second receptacle.

* * * * *